W. SPARKS.
ROTARY FAN.
APPLICATION FILED SEPT. 6, 1910.
989,884.
Patented Apr. 18, 1911.
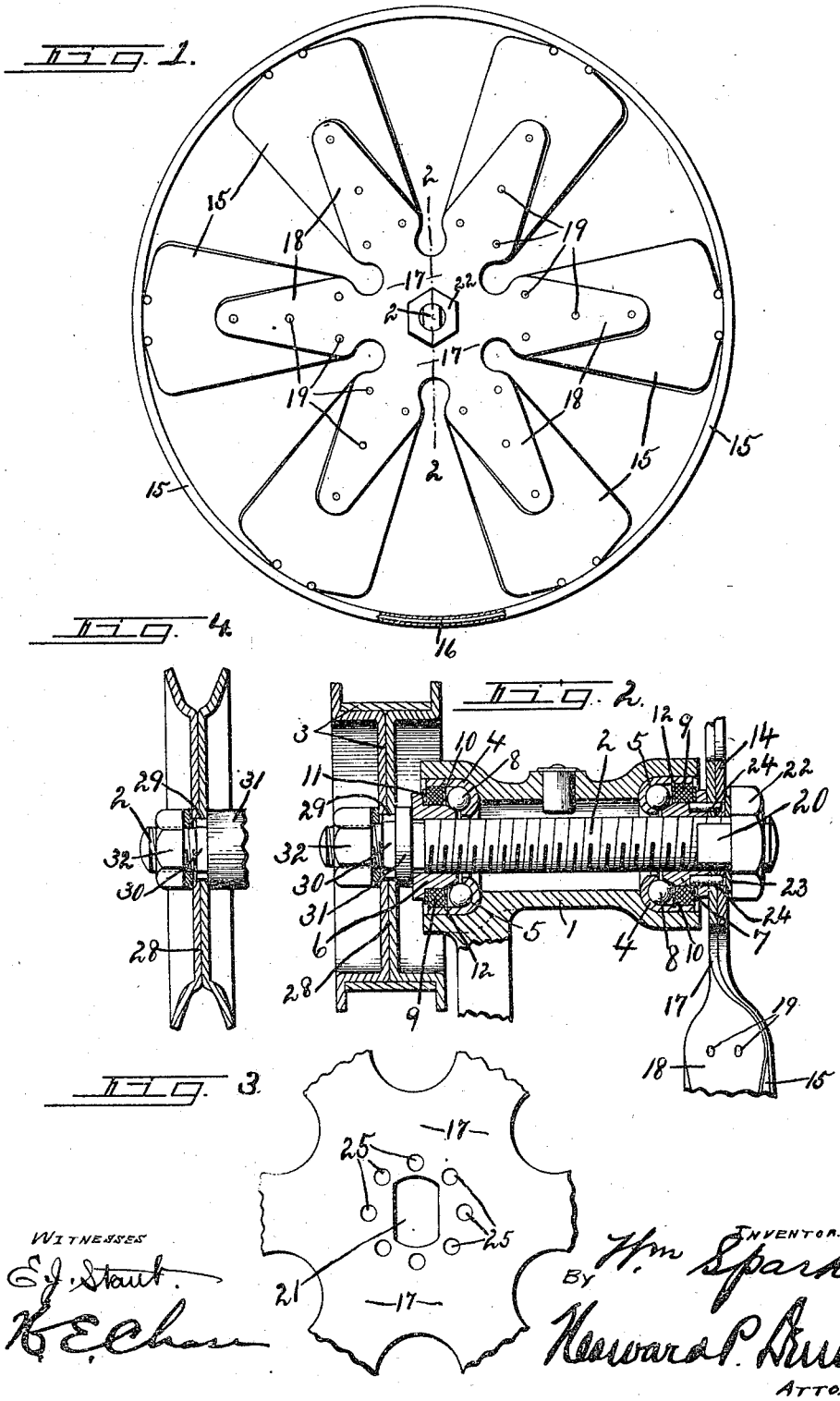

UNITED STATES PATENT OFFICE.

WILLIAM SPARKS, OF JACKSON, MICHIGAN.

ROTARY FAN.

989,884.  Specification of Letters Patent.  Patented Apr. 18, 1911.

Application filed September 6, 1910.  Serial No. 580,623.

*To all whom it may concern:*

Be it known that I, WILLIAM SPARKS, of Jackson, in the county of Jackson, in the State of Michigan, have invented new and useful Improvements in Rotary Fans, of which the following, taken in connection with the accompanying drawings, is a full, clear, and exact description.

This invention relates to certain improvements in rotary pulley driven fans and refers more particularly to the connections between the fan blades and rotary driving element upon which they are mounted.

The main object is to simplify the construction and reduce the cost of manufacture of this class of fans and at the same time to afford means whereby one of the cone bearings may be readily adjusted to take up wear and positively locked in place by the web of the fan.

A further object is to positively lock such web to the driving shaft and to the adjacent cone by sliding connections whereby the fan may be easily and quickly removed or replaced.

Other objects and uses relating to specific parts of the device will be brought out in the following description.

In the drawings: Figure 1 is an end view of a rotary fan embodying the various features of my invention. Fig. 2 is an enlarged vertical sectional view through the journal bearing and driving pulley, showing the central portions of the fan blades and connections with the rotary driving element. Fig. 3 is a face view of the central portion of the connecting web for the fan blades showing particularly the central angular openings and also the circular row of apertures surrounding the central opening for receiving the locking pins. Fig. 4 is a sectional view of modified form of driving pulley.

This fan comprises a hollow cylindrical support —1— in which is journaled a rotary shaft —2— carrying a pulley —3— which is adapted to be driven from any available source of power by a belt not shown. The opposite ends of the central bore of the cylinder —1— through which the shaft —2—
passes are enlarged for receiving suitable cup-bearings —4— which are fixed therein and have their inner ends curved inwardly and outwardly to form annular ball races —5—. The ends of the shaft —2— are screw threaded for receiving cone nuts —6— and —7—, which are adjustable and are pro-
vided with tapering inner ends forming annular bearings for anti-friction balls —8—. The outer ends of the cups —4— extend laterally some distance from the cone bearings —6— and —7— forming intervening chambers in which are located dust proof packings —9— of felt or equivalent flexible material. These and also the balls —8— are held in operative position in the cups —4— by inner and outer retaining rings —10— and —11—. The inner retaining rings are seated in annular grooves —12— in the inner faces of the cups in close proximity to the outer faces of the balls thereby preventing accidental displacement of the rings and at the same time retaining the balls in their cups when the cones are removed. The outer rings —11— are held between annular shoulders on the outer ends of the nuts or cones —6— and —7— and adjacent faces of the packings —9—. The cones —6— and —7— are threaded interiorly to engage the adjacent threaded portion of the shaft —2— so that one or the other or both of them may be adjusted to take up wear. It is evident however, that it is only necessary to adjust one of them as, the cone —7—, to accomplish this end.

The fan proper comprises a sheet metal web —14— having integral blades —15— terminating at their outer ends in a continuous overturned edge, bead or rim —15—, which is reinforced by an inclosed wire —16—, the rim or bead —15— serving as integral connection between the outer ends of the blades to hold the latter in fixed relation to each other. The web and blades are reinforced by an additional sheet metal plate or disk —17—, having a central web and radiating arms —18—, the latter being secured by suitable fastening means as rivets —19— to the blades —15—. The blades —15— and their reinforcing arms —18— are twisted or deflected at an angle to the plane of rotation for the usual purpose. The object of the reinforcing plate —17— is to permit the main body of the fan to be made of a thin sheet metal for lightness and economy.

The portion of the shaft —2— to which the fan is secured is angular in cross section and is preferably flattened at —20— on opposite sides, while the webs —14— and —17— are provided with similarly formed openings —21— fitting upon the flattened portions of the shaft and are held in their adjusted position against the adjacent end of the cone —7— by means of a nut —22— and washer —23—. The flattened or eccentric portion —20— of the shaft —2— extends inwardly from the outer end thereof beyond the outer end face of the cone —7— so as to allow the webs —14— and —17— of the fan to follow up the adjustment of the cone in taking up wear, and also permitting the fan to be readily withdrawn from the shaft when the nut —22— is removed. The cone nut —7— is provided with one or more, in this instance two diametrically opposite pins or studs —24— projecting some distance beyond the outer end face thereof and adapted to enter two of the circular series of apertures —25— in the webs —14— and —17— which are arranged concentrically around the axis thereof. The webs —14— and —17— co-acting with the pins or studs —24— serve to lock the cone nuts —7— against loosening by rotation.

In adjusting the cones to take up wear, it is simply necessary to loosen the nut —22— sufficiently to permit the webs —14— and —17— to be withdrawn axially from the pins —24—, this permitting the cone nut —7— with the pins thereon to be adjusted rotarily relatively to the webs —14— and —17— until the pins —24— are registered with another set of apertures —25— whereupon the clamping nut —22— may be retightened to clamp the fan in place and to cause the web of the fan to lock the cone against relative loosening.

Another feature of my invention consists in providing the pulley —3— with a central web —28— having a central angular opening —29— fitted snugly upon an angular portion —30— of the shaft —2—, opposite that to which the fan is secured, said pulley being held in place against axial movement between an annular shoulder —31— and the clamping nut —32—.

What I claim is:

1. In a rotary power driven fan, a stationary hub, a rotary shaft journaled in the hub and provided with cone bearings one of which is adjustable axially, fan-blades having a supporting web mounted on one end of the shaft adjacent to the adjustable cone, means for locking the web to the shaft to rotate therewith and to permit it to be moved endwise relatively thereto, separate means for locking the web to the adjustable cone to hold the latter in its adjusted position against relative movement, and movable means on the shaft to hold the web against axial movement when adjusted for use.

2. In combination with a stationary hub, a rotary threaded shaft passing centrally through the hub, a cone-nut adjustable on the threaded portion of the shaft, studs projecting axially from the outer end face of the cone, a web fitted upon the shaft and provided with apertures receiving said studs, said web and shaft having eccentric engaging portions for locking the web to the shaft to rotate therewith, a nut also engaging the threaded portion of the shaft for holding the web in engagement with the studs, and fan blades secured to the web.

3. In combination with a stationary hub and threaded shaft extending centrally through the hub, a pulley on one end of the shaft, a cone-nut adjustable on the opposite end of the shaft, a stud projecting from the outer end face of the cone-nut, a web fitted upon the shaft and provided with an aperture receiving said stud, said web and shaft having flattened bearing faces engaging each other to lock the shaft and web to rotate together, and means for holding the web in operative engagement with the stud against axial movement.

4. A rotary fan comprising a fixed hub and shaft extending centrally through the hub and having its opposite ends threaded and provided with angular portions, shoulders on said ends and pulleys slidably engaged with one of the angular end portions, a nut on the adjacent end of the shaft for holding the pulley in engagement with its angular portion, a fan having a web fitted upon the adjacent portion of the shaft to rotate therewith and slidable endwise thereon and a nut on the fan end of the shaft for holding said fan against outward endwise movement.

In witness whereof I have hereunto set my hand on this 22nd day of August, 1910.

WILLIAM SPARKS.

Witnesses:
W. J. CORBETT,
JOHN A. CLARK.